United States Patent [19]

Knerr

[11] Patent Number: 4,892,931
[45] Date of Patent: Jan. 9, 1990

[54] PURIFICATION OF POLYCARBONATE WITH EXTRACTANT/SWELLING AGENT AND ELEVATED PRESSURE AND TEMPERATURE

[75] Inventor: Manfred Knerr, Krefeld, Fed. Rep. of Germany

[73] Assignee: Bayer Aktiengesellschaft, Leverkusen, Fed. Rep. of Germany

[21] Appl. No.: 204,929

[22] Filed: May 31, 1988

Related U.S. Application Data

[63] Continuation of Ser. No. 937,382, Dec. 3, 1986, abandoned, which is a continuation of Ser. No. 748,865, Jun. 26, 1985, abandoned.

[30] Foreign Application Priority Data

Jul. 7, 1984 [DE] Fed. Rep. of Germany ....... 3425125

[51] Int. Cl.$^4$ .................................................. C08G 63/62
[52] U.S. Cl. ..................................... 528/493; 528/196; 528/483; 528/495; 528/497
[58] Field of Search ............... 528/493, 497, 495, 483, 528/196

[56] References Cited

U.S. PATENT DOCUMENTS

| | | | |
|---|---|---|---|
| 3,213,060 | 10/1965 | Jackson et al. | 528/493 |
| 3,335,115 | 8/1967 | Ludewig | 528/493 |
| 3,410,823 | 11/1968 | Cleveland | 528/493 |
| 3,463,763 | 8/1969 | Griffiths | 528/495 |
| 3,639,659 | 2/1972 | Nieswandt et al. | 528/495 |
| 3,668,181 | 6/1972 | Oxenrider | 528/483 |
| 3,780,006 | 12/1973 | Zweigle | 528/483 |
| 4,107,421 | 8/1978 | Scamehorn et al. | 528/483 |
| 4,147,859 | 4/1979 | Davis et al. | 528/495 |
| 4,230,819 | 10/1980 | Hauenstein | 528/483 |
| 4,372,758 | 2/1983 | Bobst et al. | 528/483 |

Primary Examiner—Harold D. Anderson
Attorney, Agent, or Firm—Connolly and Hutz

[57] ABSTRACT

By adding a swelling agent which does not dissolve solid polymers to plastics granulates, the morphology is extended without product damage to such as extent that residual constituents can be quickly removed down to a few ppm by diffusive transport and subsequent separation of the swelling agent. The remaining swelling agent is then removed by application of heat.

6 Claims, No Drawings

PURIFICATION OF POLYCARBONATE WITH EXTRACTANT/SWELLING AGENT AND ELEVATED PRESSURE AND TEMPERATURE

This application is a continuation of application Ser. No. 937,382, filed Dec. 3, 1986; which is a continuation of application Ser. No. 748,865 filed June 26, 1985, both abandoned.

This invention relates to a process for removing unwanted residual constituents, particularly low molecular weight components, from solid polymers by the application of heat.

For the further processing and practical application of polymers, it is desirable and, in some cases, even necessary to reduce the proportion of volatile components to low residual contents in order to avoid dangers to health, to satisfy legal requirements, to reduce environmental pollution, for example in the case of off-gases, and to improve quality by avoiding bubble formation during further processing.

In one known process, the polymers are melted in a screw extruder so that the solvent residues may escape through the continuously renewed surface, optionally under reduced pressure.

The disadvantage of this process lies in the fact that screw extruders are expensive to purchase and to operate. In addition, the quality of heat-sensitive products can soon be affected, particularly when long residence times and high temperatures are necessary for obtaining low residual contents.

It is also known that the residual constituents can be removed by enlarging the surface, for example by using smaller particle sizes for spray drying.

Since, where solvent residues are removed by evaporation, the degree of elimination increases primarily with the surface enlargement, considerable technical effort is necessary if low residual contents are to be obtained. On the other hand, the plastic becomes more difficult to handle by the processor as its fineness increases.

The object of the present invention is to provide a process in which residues of low molecular weight components, such as solvents, monomers, oligomers, catalysts or chain terminators, can be quickly removed from a polymeric solid to below the thermal equilibrium level, in which no product damage, such as streaking, color changes or structural changes, occurs and in which the physical form (for example granulate) favorable for further processing remains intact.

According to the invention, this object is achieved by the following steps:

(a) adding an extractant in the form of a liquid or gas which has very little, if any dissolving effect on the polymer;

(b) changing the morphology by widening the chain intervals (swelling) of the solid polymers to accelerate the diffusion of materials through the extractant in a certain pressure range and at a temperature between ambient temperature and the glass transition temperature;

(c) separating the extractant enriched with residual constituents;

(d) evaporation of the residual extractant together with the residual constituents therein in known manner by the application of heat.

So far as the expert is concerned, it is surprising that there should be no product damage in the case of granulates, although the appearance of the material changes on swelling (for example from glass clear to milky white in the case of polycarbonate) and macroscopic voids (<3% of the particle size of 1–3 mm) down to so-called crazes can be formed.

Another advantage lies in the fact that, with the hitherto known processes, it was in general only economically possible to remove residual constituents in the percentage range, whereas with the process according to the invention it is possible to remove residual constituents into the ppm range (1000–5 ppm). In the presence of the swelling agent, diffusion takes place more quickly by powers of 10 than in the case of heat-induced diffusion, so that the additional costs of the preliminary steps are more than compensated. At the same time, the short residence time provides for excellent product quality, particularly in the case of heat-sensitive products. The extractant used is a liquid, a liquid gas or a gas under super critical pressure. In the context of the invention, slight solubility is understood to mean that $\leq =1\%$ by weight of the polymer dissolves in 24 hours. The process pressure is reduced with increasing swelling power of the extractant.

In the interests of effectiveness, the process temperature should preferably be 5° to 10° C. below the glass transition temperature.

In one particular embodiment of the process, an increase in the original volume of from 1 to 10% by volume is adjusted by swelling.

In the above range, good results can be obtained without product damage by virtue of the short residence times. The increase in volume should preferably amount to between 5 and 10% by volume for a pressure of $\leq =5$ bar or to between 1 and 5% by volume for a higher pressure.

In another embodiment of the process, a predetermined quantity of extractant is brought into contact with the polymer after the desired removal of unwanted residual constituents.

By increasing the proportion of extractant, the residual content can be reduced to values below the concentration of the thermal equilibrium so that it can no longer be detected. In this case, the standard 2- to 5-fold amount may be introduced continuously or in batches.

In another embodiment of the process, the extractant with favorable swelling properties is used under a low pressure of one bar or less.

Given favorable swelling properties, only a low pressure need be applied. Suitable extractants are, for example, acetone, methyl ethyl ketone, diethyl ketone, toluene and xylene. The swelling properties of these extractants increase in the order in which they have just been mentioned. However, the effort involved in their subsequent removal also increases in that order.

In one embodiment of the process, an extractant which does not have any swelling properties under ambient conditions (~1 bar, ~20° C.) is used at elevated temperature and pressure.

The advantage of this process lies in the fact that, although the extractants, for example lower alcohols (ethanol >3 bar; >110° C.) or supercritical carbon dioxide (>200 bar; >100° C.), have to be used under difficult conditions for the purpose of transport by diffusion, the subsequent complete removal of the extractant under environmental conditions (for example by simple expansion) is considerably easier than in the case of high-swelling extractants.

The invention is illustrated by the following Examples.

EXAMPLE 1

Polycarbonate granulate having an average particle size of 2.8 mm contains 760 ppm of chlorobenzene as impurity. After batch extraction for 2.5 hours with twice the quantity of xylene at 140° C./ambient pressure, the residual content is reduced to 25 ppm of chlorobenzene.

EXAMPLE 2

Extraction is carried out with xylene (ratio by weight of xylene to granulate 3:1) in the same way as in Example 1, but for 3 hours at a temperature of 80° C. This treatment reduces the chlorobenzene content from 12,500 ppm to 120 ppm.

EXAMPLE 3

Extraction is carried out with toluene (ratio by weight of toluene to granulate 3:1) in the same way as in Example 1 for 3 hours at 80° C. This treatment reduces the chlorobenzene content from 12,500 ppm to 495 ppm.

EXAMPLE 4

Extraction is carried out as in Example 1 with acetone (ratio by weight of acetone to granulate 3:1), the temperature being kept at 56° C. for 3 h. This treatment reduces the chlorobenzene content first from 12,500 ppm to 790 ppm and then from 790 ppm to 150 ppm.

EXAMPLE 5

Extraction is carried out as in Example 1 with ethanol (ratio by weight of ethanol to granulate 3:1) under a pressure of 14.5 bar. After treatment for 3 hours at 145° C., the residual content has fallen from 750 ppm to 15 ppm.

EXAMPLE 6

Extraction is carried out as in Example 1 with supercritical carbon dioxide at 153° C./260 bar. After treatment for 5 hours with 4 times the quantity of carbon dioxide, the residual content had fallen from 760 ppm to 155 ppm.

I claim:

1. A process for the non-destructive removal of unwanted residual constituents from solid polycarbonate polymer by the application of heat and pressure, comprising the following steps:
    (a) adding an extractant to the solid polycarbonate polymer which has no significant dissolving effect on the polymer and which is selected from the group consisting of acetone, methyl ethyl ketone, diethyl ketone, toluene, xylene, ethanol, and super critical carbon dioxide;
    (b) changing the morphology of the polymer by swelling to widen the space between the polymeric chains comprising the solid polymer to accelerate the diffusion of unwanted residual constituents into the extractant at elevated pressure and at a temperature in the range from ambient temperature to the glass transition temperature of the polymer;
    (c) separating the extractant enriched with residual constituents;
    (d) evaporating of the residual extractant together with the residual constituents therein by the application of heat.

2. A process as claimed in claim 1 wherein an increase in the volume of the polymer of from 1 to 10% by volume is obtained by swelling.

3. A process as claimed in claim 1 wherein the degree of removal of unwanted residual constituents is predetermined by the quantity of extractant used.

4. A process as claimed in claim 1 wherein the extractant has a favorable swelling effect on the polymer and is used under an elevated pressure to 5 bar.

5. A process as claimed in claim 1 wherein the extractant is a liquid.

6. A process as claimed in claim 1 wherein the temperature in step (b) is about 5°-10° C. less than the polymer glass transition temperature.

* * * * *